United States Patent
Coppinger et al.

(10) Patent No.: US 10,721,278 B2
(45) Date of Patent: *Jul. 21, 2020

(54) ANNOTATING COLLABORATIVE INFORMATION STRUCTURES

(71) Applicant: SINOEAST CONCEPT LIMITED, Hong Kong (HK)

(72) Inventors: Jodi L. Coppinger, Merrimack, NH (US); Michael Muller, Medford, MA (US); Andrew L. Schirmer, Andover, MA (US)

(73) Assignee: SINOEAST CONCEPT LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,963

(22) Filed: Dec. 11, 2018

(65) Prior Publication Data

US 2019/0116211 A1    Apr. 18, 2019

Related U.S. Application Data

(60) Continuation of application No. 15/096,008, filed on Apr. 11, 2016, now Pat. No. 10,154,069, which is a
(Continued)

(51) Int. Cl.
*H04L 29/06* (2006.01)
*G06Q 10/10* (2012.01)
(Continued)

(52) U.S. Cl.
CPC ........ *H04L 65/4015* (2013.01); *G06F 16/287* (2019.01); *G06F 40/169* (2020.01); *G06Q 10/10* (2013.01); *G06Q 10/101* (2013.01)

(58) Field of Classification Search
CPC ............ G06F 17/241; G06F 17/30929; G06F 17/242; G06F 17/30011; G06F 17/212; G06F 17/2288; G06Q 10/10
See application file for complete search history.

(56) References Cited

U.S. PATENT DOCUMENTS 5,617,539 A    4/1997 Ludwig et al.
6,513,033 B1 *  1/2003 Trauring ............... G06Q 10/10
(Continued)

OTHER PUBLICATIONS

Tuncer et al. "Collaborative information structures: education and research experiences." France, 2000, pp. 20-28.

*Primary Examiner* — Maikhanh Nguyen
(74) *Attorney, Agent, or Firm* — Anova Law Group, PLLC

(57) ABSTRACT

Embodiments of the present invention address deficiencies of the art in respect to collaborative information object management and provide a method, system and computer program product for annotating collaborative information structures. In an embodiment of the invention, a method for annotating collaborative information structures can be provided. The method can include creating a collaborative information structure document (ISD) with each of an object section and an annotation section, adding a collaborative object in a collaborative computing environment to the object section of the collaborative ISD, adding an annotation for the collaborative ISD to the annotation section of the collaborative ISD, and storing the collaborative ISD for use as a collaborative object in the collaborative computing environment.

19 Claims, 1 Drawing Sheet

Related U.S. Application Data continuation of application No. 13/603,360, filed on Sep. 4, 2012, now Pat. No. 9,311,621, which is a division of application No. 11/966,131, filed on Dec. 28, 2007, now Pat. No. 8,291,308.

(51) Int. Cl.
*G06F 16/28* (2019.01)
*G06F 40/169* (2020.01)

(56) References Cited

U.S. PATENT DOCUMENTS

| | | | |
|---|---|---|---|
| 6,519,603 B1 | 2/2003 | Bays et al. | |
| 7,043,529 B1 | 5/2006 | Simonoff | |
| 7,051,274 B1 | 5/2006 | Cottrille et al. | |
| 7,209,948 B2* | 4/2007 | Srinivasa | G06F 17/241 |
| | | | 709/204 |
| 7,296,023 B2 | 11/2007 | Geyer et al. | |
| 7,373,590 B2 | 5/2008 | Woolf et al. | |
| 7,412,482 B2 | 8/2008 | Ludwig et al. | |
| 7,421,470 B2 | 9/2008 | Ludwig et al. | |
| 7,472,341 B2 | 12/2008 | Albornoz et al. | |
| 7,509,295 B2 | 3/2009 | Rokosz et al. | |
| 7,532,340 B2 | 5/2009 | Koppich et al. | |
| 7,551,780 B2 | 6/2009 | Nudd et al. | |
| 7,613,773 B2 | 11/2009 | Watt | |
| 7,647,373 B2 | 1/2010 | Johnson et al. | |
| 7,797,381 B2 | 9/2010 | Zhang et al. | |
| 7,962,847 B2 | 6/2011 | Malkin | |
| 8,028,020 B2 | 9/2011 | Huck et al. | |
| 9,026,901 B2* | 5/2015 | Dettinger | G06F 16/252 |
| | | | 715/230 |
| 2002/0026323 A1* | 2/2002 | Sakaguchi | G06Q 10/10 |
| | | | 715/230 |
| 2004/0107254 A1 | 6/2004 | Ludwig et al. | |
| 2004/0194021 A1* | 9/2004 | Marshall | G06F 17/241 |
| | | | 715/232 |
| 2004/0260702 A1* | 12/2004 | Cragun | G06F 16/954 |
| 2004/0260714 A1* | 12/2004 | Chatterjee | G06F 16/954 |
| 2004/0260717 A1 | 12/2004 | Albornoz et al. | |
| 2005/0065903 A1 | 3/2005 | Zhang et al. | |
| 2005/0102245 A1* | 5/2005 | Edlund | G06Q 10/109 |
| | | | 705/80 |
| 2005/0165859 A1 | 7/2005 | Geyer et al. | |
| 2005/0256825 A1* | 11/2005 | Dettinger | G06F 16/252 |
| 2006/0167938 A1 | 7/2006 | Muller et al. | |
| 2007/0185873 A1 | 8/2007 | Muller et al. | |
| 2007/0185959 A1 | 8/2007 | Huck et al. | |
| 2008/0159286 A1 | 7/2008 | Moore et al. | |
| 2009/0260060 A1* | 10/2009 | Smith | G06Q 10/10 |
| | | | 726/3 |

\* cited by examiner

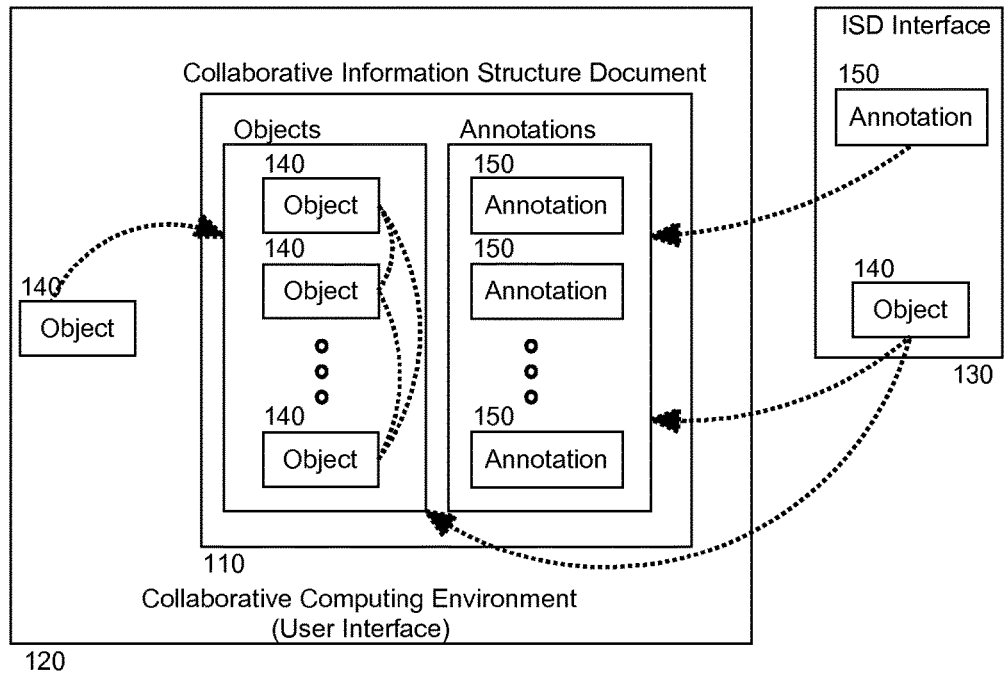
FIG. 1
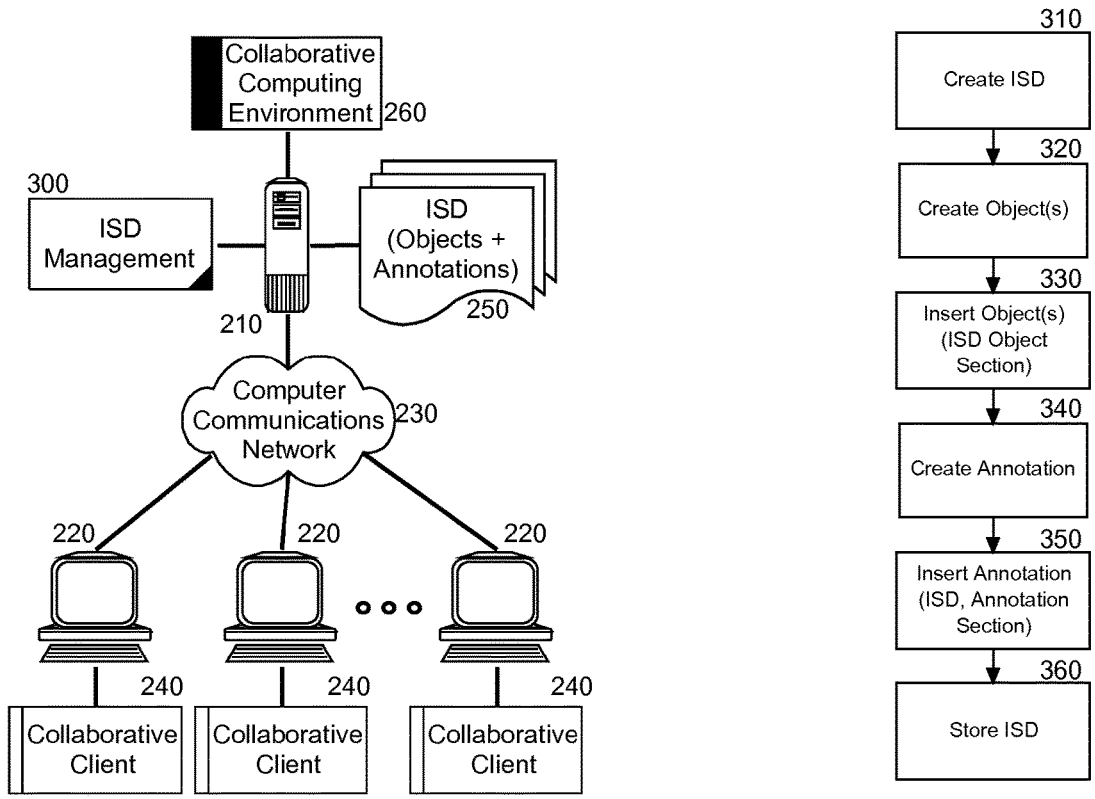
FIG. 2
FIG. 3

ANNOTATING COLLABORATIVE INFORMATION STRUCTURES

CROSS-REFERENCE TO RELATED APPLICATIONS

This application is a Continuation of U.S. patent application Ser. No. 15/096,008, filed on Apr. 11, 2016 and now issued as U.S. Pat. No. 10,154,069, which is a Continuation of U.S. patent application Ser. No. 13/603,360, filed on Sep. 4, 2012 and now issued as U.S. Pat. No. 9,311,621, which is a Divisional of U.S. patent application Ser. No. 11/966,131, filed on Dec. 28, 2007 and now issued as U.S. Pat. No. 8,291,308, the entirety of each of which is incorporated herein by reference.

BACKGROUND OF THE INVENTION

Field of the Invention

The present invention relates to the field of collaborative computing and more particularly to the grouping of collaborative objects within a collaborative information structure.

Description of the Related Art

Collaborative computing refers to the use by two or more end users of a computing application in order to achieve a common goal. Initially envisioned as a document sharing technology among members of a small workgroup in the corporate environment, collaborative computing has grown today to include a wide variety of technologies arranged strategically to facilitate collaboration among members of a workgroup. No longer merely restricted to document sharing, the modern collaborative environment can include document libraries, chat rooms, video conferencing, application sharing, and discussion forums to name only a few.

A collaborative computing application enjoys substantial advantages over a more conventional, individualized computing application. Specifically, at present it is rare that a goal of any importance is entrusted and reliant upon a single person. In fact, most goals and objectives can be achieved only through the participation of a multiplicity of individuals, each serving a specified role or roles in the process. Consequently, to provide computing tools designed for use only by one of the individuals in the process can be short sighted and can ignore important potential contributions lying among the other individuals involved in the process.

Collaborative computing environments account for the actual nature of a coordinated set of collaborative tasks conducted by people, such as an activity. An activity, unlike a typical project or traditional workflow, refers to objects, actions, and persons in the real world, and provides a computerized representation of selected aspects of those objects, actions, and persons within a collaborative information structure. A collaborative information structure includes ordered relationships between objects, actions and persons, collectively collaborative information objects. An exemplary collaborative information structure includes an activity. Other examples include collaborative workflows, business processes, team rooms, discussion databases, and the like.

In this regard, a simple collaborative workflow might include an ordered set of tasks assigned to several collaborators. The tasks and collaborators in this case are to be viewed as collaborative information objects while the workflow is the collaborative information structure. Typically, a software application designed to create and manage collaborative information structures provides a user interface to display the collaborative information structures in various ways to show the objects, their relationships, and order dependencies. One example of such a software application is an activity manager. Yet, no existing system provides a display that is both complete and descriptive in a way that accommodates flexible human-generated annotations.

BRIEF SUMMARY OF THE INVENTION

Embodiments of the present invention address deficiencies of the art in respect to collaborative information object management and provide a novel and non-obvious method, system and computer program product for annotating collaborative information structures. In an embodiment of the invention, a method for annotating collaborative information structures can be provided. The method can include creating a collaborative information structure document (ISD) with each of an object section and an annotation section, adding a collaborative object in a collaborative computing environment to the object section of the collaborative ISD, adding an annotation for the collaborative ISD to the annotation section of the collaborative ISD, and storing the collaborative ISD for use as a collaborative object in the collaborative computing environment.

In one aspect of the embodiment, adding a collaborative object in a collaborative computing environment to the object section of the collaborative ISD, further can include adding a reference to a collaborative object in the collaborative computing environment to the object section of the collaborative ISD. In another aspect of the embodiment, adding an annotation for the collaborative ISD to the annotation section of the collaborative ISD, can include adding rich media content as an annotation for the collaborative ISD to the annotation section of the collaborative ISD. In yet another aspect of the embodiment, adding an annotation for the collaborative ISD to the annotation section of the collaborative ISD, further can include adding a reference to a collaborative object as an annotation for the collaborative ISD to the annotation section of the collaborative ISD.

In another embodiment of the invention, a collaborative computing data processing system can be provided. The system can include a collaborative computing environment including different collaborative objects. The system also can include collaborative ISD disposed in the collaborative computing environment as a collaborative object. The collaborative ISD can include an object section and a separate annotations section. The object section can encapsulate collaborative objects, while the annotations section can encapsulate annotations to the collaborative ISD. Finally, the system can include a collaborative ISD interface providing access to add objects to either of the object section and the annotations section of the collaborative ISD and annotations to the annotations section of the collaborative ISD.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for annotating collaborative information structures;

FIG. 2 is a schematic illustration of a collaborative computing data processing system configured for annotating collaborative information structures; and, FIG. 3 is a flow chart illustrating a process for annotating collaborative information structures.

DETAILED DESCRIPTION OF THE INVENTION

Embodiments of the present invention provide a method, system and computer program product for annotating collaborative information structures. In accordance with an embodiment of the present invention, a collaborative ISD can be provided for use as a collaborative object in a collaborative computing environment. The collaborative ISD can encapsulate both collaborative objects for the collaborative computing environment, and also annotations with contextual content relating to the collaborative objects. In this regard, the annotations can include both textual content and other rich media content including references to other collaborative objects. In this a collaborative object or set of objects in the collaborative computing system can grow in meaning over time as annotations are added to an encapsulating collaborative ISD to provide greater context for the collaborative ISD.

In further illustration, FIG. 1 is a pictorial illustration of a process for annotating collaborative information structures. As shown in FIG. 1, a collaborative computing environment 120 can be provided. The collaborative computing environment 120 can include a user interface through which collaborators can specify activities with collaborative objects 140 such as tasks, shared documents and messages for interaction with other collaborators specified by name or by role. The collaborative computing environment 120 further can include a collaborative ISD 110. The collaborative ISD 110 can include both an objects section and an annotations section. The objects section can encapsulate collaborative objects 140 for a collaborative information structure such as an activity. The annotations section, by comparison, can encapsulate annotations 150 providing context for the collaborative information structure.

Collaborative objects 140 can be added to the collaborative ISD 110 directly to the objects section of the collaborative ISD 110 through the user interface provided by the collaborative computing environment, or through an ISD interface 130. The ISD interface 130, however, can permit the addition of annotations 150 to the annotation section of the collaborative ISD 110. The ISD interface 130 also can permit the addition of objects 140 either to the annotation section of the collaborative ISD 110 (as an annotation) or to the objects section of the collaborative ISD 110. In all cases, the objects 140 and annotations 150 also can include references to other objects 140 in the collaborative computing environment 120. In any event, the entirety of the collaborative ISD 110 can be manipulated within the collaborative computing environment 120 as any other collaborative object 140, while enjoying added context provided by the annotations section of the collaborative ISD 110.

In this regard, objects 140 created from outside of the collaborative ISD 110 are automatically added to the objects section of the collaborative ISD 110 corresponding to the particular information structure within the collaborative computing environment 120. Thus, the objects 140 of the information structure can be completely represented within the collaborative ISD 110 and the two can remain in sync. In one aspect of the embodiment, a given one of the object 140 can exist in either the objects section or the annotation section of the collaborative ISD 110. However, in another embodiment, a given one of the objects 140 can exist in both.

In operation, an end user can move objects 140 from the object section of the collaborative ISD 110 to the annotation section of the collaborative ISD 110 for additional annotation. Yet, at any time an end user can move the objects 140 from the annotation section of the collaborative ISD 110 back to the objects section of the collaborative ISD 110. Notably, objects 140 removed from the annotation section of the collaborative ISD 110 can be automatically moved to the objects section of the collaborative ISD 110 and are not deleted from the collaborative computing environment 120. However, objects 140 "deleted" from either section of the collaborative ISD 110 are deleted from the information structure and objects 140 deleted from the information structure are deleted from the collaborative ISD 110. Optionally, objects 140 deleted from either section of the collaborative ISD 110 can be replaced by a marker documenting the previous existence of the objects 140, along with simple information regarding the deleted objects 140, for instance a complete log of all actions relating to the objects 140. As yet a further option, objects 140 and/or their respective annotations can be archived and recovered from within the collaborative ISD 110.

The collaborative ISD 110 of FIG. 1 can be managed within a collaborative computing data process system. In this regard, FIG. 2 is a schematic illustration of a collaborative computing data processing system configured for annotating collaborative information structures. The system can include a host server 210 configured for communicative coupling to multiple different computing devices 220 over computer communications network 230. The host server 210 can support the operation of a collaborative computing environment 260 forming a collaborative computing system with collaborative computing clients 240 in each of the different computing devices 220 over the computer communications network 230.

ISD management logic 300 can be coupled to the collaborative computing environment 260 through the host server 210 and can include program code enabled to create and manage collaborative ISD documents 250. Each of the collaborative ISD documents 250 can include an object section and an annotation section, the object section encapsulating collaborative objects in the collaborative computing environment 260 and the annotations section encapsulating annotations and objects acting as annotations to the objects in the object section. The collaborative ISD documents 250, however, can be manipulated within the collaborative computing environment 260 as any other collaborative information structure such as an activity or workflow.

In further illustration, FIG. 3 is a flow chart illustrating a process for annotating collaborative information structures. The process can begin in block 310 with the creation of a collaborative ISD document. In block 320, one or more collaborative objects such as tasks or collaborators can be selected and in block 330, the collaborative objects can be added to an object section of the collaborative ISD document. Similarly, in block 340 one or more annotations can be created for the collaborative ISD document and the annotations can be inserted into an annotations section of the collaborative ISD document in block 350. Finally, in block 360 the collaborative ISD can be stored for manipulation in the collaborative computing environment.

It is to be recognized by the skilled artisan that the order implied by blocks 320 through 350 are not requisite to the annotation of collaborative information structures. Rather, annotations also can be added to the collaborative ISD before the collaborative objects to which the annotations refer. Consequently, collaborative objects can be created from within a collaborative ISD to permit a fluid annotation process. For example, the user provide an annotation first, such as, "Initial project tasks include:" and second the user can create the actual objects (the project tasks) which can be linked to the annotation by reference or displayed in-line. Having created the actual objects and not just placeholders, the user has accomplished work in context in a natural flow. Thus, the act of creating the objects from within the ISD then causes those objects to exist in the collaborative computing environment.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A collaborative computing data processing system for annotating collaborative information structures comprising:
    a host server having at least one processor and a memory; and,
    information structure document (ISD) management logic executing in the memory of the host server, the ISD management logic comprising program code that when executed by the at least one processor of the host server causes the host server to:
    create a collaborative ISD comprising an object section and a separate annotation section,
    add a collaborative object to the object section of the collaborative ISD,
    add an annotation to the separate annotation section of the collaborative ISD,
    store the collaborative ISD,
    move the collaborative object from the object section to the separate annotation section as an additional annotation in response to a user input at a collaborative ISD interface executed by the at least one processor of the host server, and
    automatically move the collaborative object from the separate annotation section back to the object section in response to a user performing a removing operation to the collaborative object in the separate annotation section through the collaborative ISD interface.

2. The collaborative computing data processing system of claim 1, wherein the program code that when executed by the at least one processor of the host server causes the host server to add the collaborative object to the object section of the collaborative ISD further comprises program code to add a reference to a second collaborative object in the object section of the ISD.

3. The collaborative computing data processing system of claim 1, wherein the annotation is rich media content.

4. The collaborative computing data processing system of claim 1, wherein the program code that when executed by the at least one processor of the host server causes the host server to add the annotation to the separate annotation section of the collaborative ISD further comprises program code to add a reference as an annotation to a second collaborative object in the separate annotation section of the ISD.

5. The collaborative computing data processing system of claim 1, wherein the program code that when executed by the at least one processor of the host server causes the host server to add the collaborative object to the object section of the collaborative ISD comprises program code to create the collaborative object from within the collaborative ISD.

6. The collaborative computing data processing system of claim 1, wherein the ISD management logic further comprises program code that when executed by the at least one processor of the host server causes the host server to:
    select a stored collaborative ISD;
        open an annotation from the separate annotation section of the selected stored collaborative ISD;
        edit the annotation; and,
        re-store the selected stored collaborative ISD upon completion of the editing of the annotation.

7. The collaborative computing data processing system of claim 1, wherein the ISD management logic further comprises program code that when executed by the at least one processor of the host server causes the host server to:

create a new annotation;
store the new annotation the separate annotation section of the collaborative ISD.

8. The collaborative computing data processing system of claim 1, wherein the ISD management logic further comprises program code that when executed by the at least one processor of the host server causes the host server to:
delete the collaborative object from the collaborative ISD; and,
add a marker to the collaborative ISD referencing the deleted collaborative object.

9. The collaborative computing data processing system of claim 1, wherein the collaborative object is at least one of a task, a shared document, and a message for interaction with other collaborators.

10. The collaborative computing data processing system of claim 1, wherein the ISD management logic further comprises program code that when executed by the at least one processor of the host server causes the host server to add the collaborative object to the separate annotation section of the collaborative ISD, where the collaborative object added to the separate annotation section of the collaborative ISD is added an annotation of the collaborative object.

11. A collaborative computing data processing method for annotating collaborative information structures, comprising:
creating, by an information structure document (ISD) management logic stored in a memory of a host server and executed by a processor of the host server, a collaborative ISD comprising an object section and a separate annotation section;
adding, by the ISD management logic of the host server, a collaborative object to the object section of the collaborative ISD;
adding, by the ISD management logic of the host server, an annotation to the separate annotation section of the collaborative ISD;
storing, by the ISD management logic of the host server, the collaborative ISD;
moving, by the ISD management logic of the host server, the collaborative object from the object section to the separate annotation section as an additional annotation in response to a user input at a collaborative ISD interface executed by the processor of the host server; and
automatically moving, by the ISD management logic, the collaborative object from the separate annotation section back to the object section in response to a user performing a removing operation to the collaborative object in the separate annotation section through the collaborative ISD interface.

12. The method of claim 11, wherein adding the collaborative object to the object section of the collaborative ISD comprises:
adding a reference to a second collaborative object in the object section of the ISD.

13. The method of claim 11, wherein the annotation is rich media content.

14. The method of claim 11, wherein adding the annotation to the separate annotation section of the collaborative ISD comprises:
adding a reference as an annotation to a second collaborative object in the separate annotation section of the ISD.

15. The method of claim 11, wherein the program code that when executed by the at least one processor of the host server causes the host server to add the collaborative object to the object section of the collaborative ISD comprises program code to create the collaborative object from within the collaborative ISD.

16. The method of claim 11, further comprising:
selecting a stored collaborative ISD;
opening an annotation from the separate annotation section of the selected stored collaborative ISD;
editing the annotation; and,
re-storing the selected stored collaborative ISD upon completion of the editing of the annotation.

17. The method of claim 11, further comprising:
creating a new annotation;
storing the new annotation the separate annotation section of the collaborative ISD.

18. The method of claim 11, further comprising:
deleting the collaborative object from the collaborative ISD; and,
adding a marker to the collaborative ISD referencing the deleted collaborative object.

19. A non-transitory computer readable storage medium storing computer instructions, the computer instructions when being executed by a processor of a host server, cause the processor to perform:
creating, by an information structure document (ISD) management logic executed by the processor of the host server, a collaborative ISD comprising an object section and a separate annotation section;
adding, by the ISD management logic, a collaborative object to the object section of the collaborative ISD;
adding, by the ISD management logic, an annotation to the separate annotation section of the collaborative ISD;
storing, by the ISD management logic, the collaborative ISD;
moving, by the ISD management logic, the collaborative object from the object section to the separate annotation section as an additional annotation in response to a user input at a collaborative ISD interface executed by the processor of the host server; and
automatically moving, by the ISD management logic, the collaborative object from the separate annotation section back to the object section in response to a user performing a removing operation to the collaborative object in the separate annotation section through the collaborative ISD interface.

* * * * *